United States Patent
Yokomizo

(10) Patent No.: US 8,122,164 B2
(45) Date of Patent: Feb. 21, 2012

(54) INFORMATION PROCESSING APPARATUS HAVING FIRST DMA CONTROLLER AND SECOND DMA CONTROLLER WHEREIN SELECTION CIRCUIT DETERMINES WHICH DMA WILL PERFORM DATA TRANSFER BASED ON HIGHER DATA TRANSFER PERFORMANCE

(75) Inventor: So Yokomizo, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 108 days.

(21) Appl. No.: 12/555,090

(22) Filed: Sep. 8, 2009

(65) Prior Publication Data

US 2010/0082850 A1   Apr. 1, 2010

(30) Foreign Application Priority Data

Sep. 26, 2008  (JP) ................. 2008-249134

(51) Int. Cl.
*G06F 13/28* (2006.01)
(52) U.S. Cl. ............ 710/28; 710/22; 710/23; 710/33; 710/38; 711/151; 711/152; 711/153
(58) Field of Classification Search .............. 710/22, 710/23, 28, 33, 38; 711/151–153
See application file for complete search history.

(56) References Cited

U.S. PATENT DOCUMENTS

| 6,944,682 | B2 | 9/2005 | Tanaka | 710/22 |
| 7,213,084 | B2 * | 5/2007 | Ogilvie et al. | 710/22 |
| 7,689,732 | B2 * | 3/2010 | Chen et al. | 710/22 |
| 7,917,667 | B2 * | 3/2011 | Hayashi | 710/22 |

FOREIGN PATENT DOCUMENTS

| JP | 03-139751 | 6/1991 |
| JP | 2003-281078 | 3/2003 |
| JP | 2004-208094 | 7/2004 |

* cited by examiner

*Primary Examiner* — Tammara Peyton
(74) *Attorney, Agent, or Firm* — Fitzpatrick, Cella, Harper & Scinto

(57) ABSTRACT

Provided is an information processing apparatus and method of controlling same in which, when data transfer is performed among a plurality of control circuits, which control circuit is used to execute data transfer is controlled appropriately based on the transfer conditions of data transfer. To accomplish this, the apparatus has first and second control circuits, a request for data transfer performed between the first and second control circuits is acquired, the transfer conditions of the acquired data transfer are analyzed and which of the first and second control circuits is to execute the data transfer is selected.

4 Claims, 7 Drawing Sheets

FIG. 3A

| COPY SOURCE | COPY DESTINATION | TRANSFER RATE (MB / Sec) |
|---|---|---|
| MAIN MEMORY AREA 1 | SUBMEMORY AREA 2-1 | 100 |
| MAIN MEMORY AREA 1 | SUBMEMORY AREA 2-2 | TRANSFER NOT POSSIBLE |
| SUBMEMORY AREA 2-1 | MAIN MEMORY AREA 1 | 60 |
| SUBMEMORY AREA 2-2 | MAIN MEMORY AREA 1 | TRANSFER NOT POSSIBLE |

FIG. 3B

| COPY SOURCE | COPY DESTINATION | TRANSFER RATE (MB / Sec) |
|---|---|---|
| MAIN MEMORY AREA 1 | SUBMEMORY AREA 2-1 | 25 |
| MAIN MEMORY AREA 1 | SUBMEMORY AREA 2-2 | 25 |
| SUBMEMORY AREA 2-1 | MAIN MEMORY AREA 1 | 80 |
| SUBMEMORY AREA 2-2 | MAIN MEMORY AREA 1 | 80 |

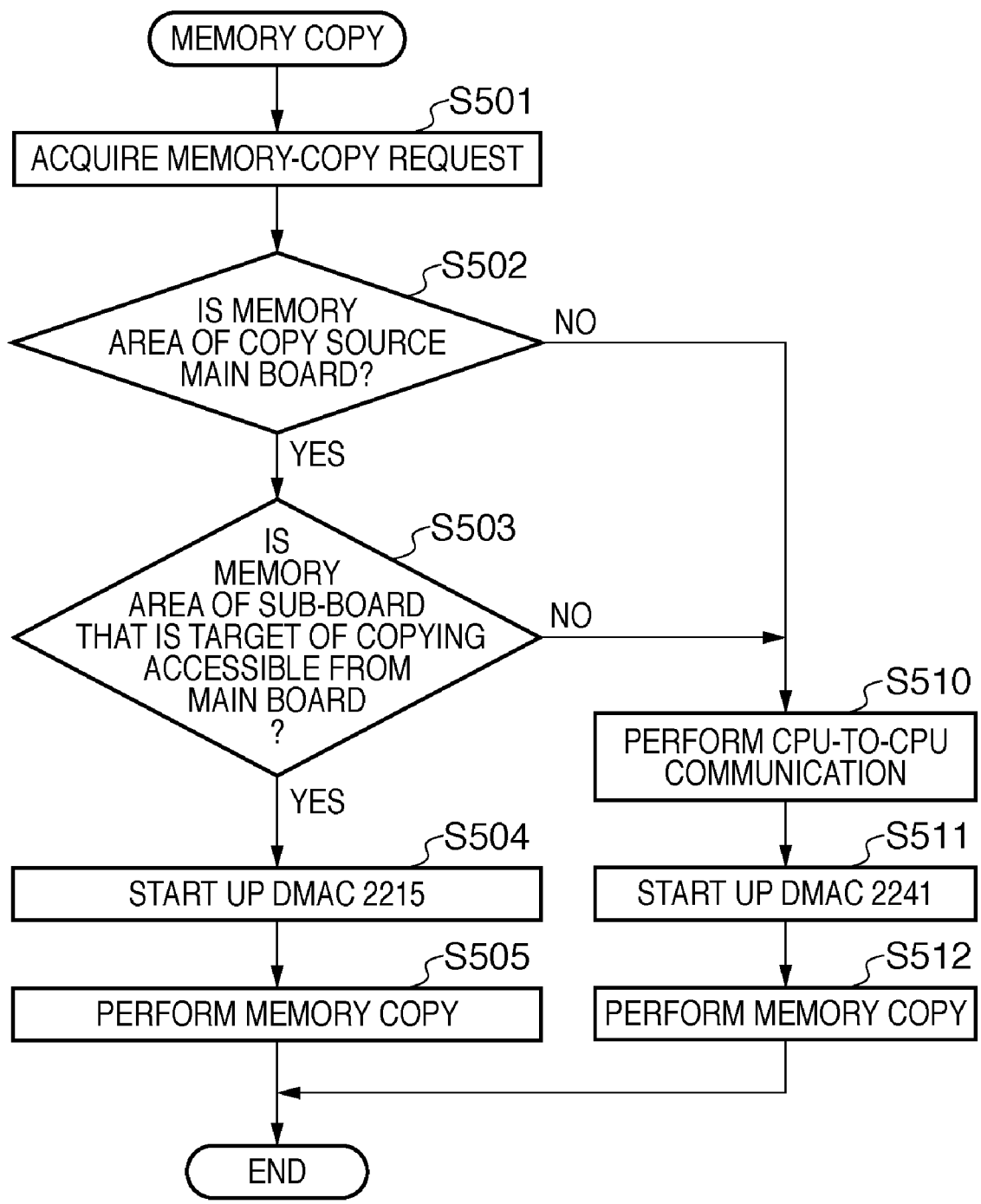

INFORMATION PROCESSING APPARATUS HAVING FIRST DMA CONTROLLER AND SECOND DMA CONTROLLER WHEREIN SELECTION CIRCUIT DETERMINES WHICH DMA WILL PERFORM DATA TRANSFER BASED ON HIGHER DATA TRANSFER PERFORMANCE

BACKGROUND OF THE INVENTION

1. Field of the Invention

The present invention relates to an information processing apparatus and to a method of controlling the same.

2. Description of the Related Art

An image forming apparatus such as a multifunction peripheral has a copy function that can be executed independently and a print function for printing an image based on image data sent from a host apparatus such as a host computer. Such an image forming apparatus is equipped with a plurality of units comprising a CPU and memory in order to support advanced functionality and these functions are implemented by utilizing copying of data from memory, etc. Usually a DMA controller is used in order to speed up data copying.

For example, the specification of Japanese Patent Laid-Open No. 03-139751 proposes a technique whereby communication data is transmitted upon being split into a predetermined burst size in DMA transfer. More specifically, the order of priority of all DMA transfer requests is determined whenever a single transfer ends, and DMA transfer is carried out upon changing over to a channel having a high priority. The efficiency of data transfer is improved by repeating this processing.

Further, the specification of Japanese Patent Laid-Open No. 2004-208094 proposes a system having a DMA unit for transferring pixel data from a memory to an image compressing unit, the image compressing unit and a DMA unit for transferring compressed code from the image compressing unit to the memory. With this system, the units of data processing by each of the plurality of DMA units and compressing unit is not fixed and control is exercised independently to thereby prevent a decline in memory utilization efficiency.

Further, as a method of generating an image in an image forming apparatus, the specification of Japanese Patent Laid-Open No. 2003-281078 proposes a technique in which two DMA controllers are used when an image is processed in band units and delivered in DMA output. More specifically, one of the DMA controllers is used in the development (memory write) of an expanded image, and the other DMA controller is used in readout (memory read) of the image that has been developed in memory. Thus, two DMA controllers are used and the two DMA controllers, which are operating in parallel, are controlled by a pause bit utilizing descriptor information that has been stored in an external memory, whereby image processing is executed efficiently without reversing the memory write and memory read operations.

However, the following problem arises with the prior art described above. For example, although a method of using a plurality of DMA controllers has been proposed, processing is executed on the assumption that both of the DMA controllers have the same transfer performance, and a case where transfer performance differs owing to the connections and arrangement is not taken into consideration. In a case where a plurality of DMA controllers operate, there are instances where the performance of each the DMA controllers differs depending upon memory type, that is, transfer source or transfer destination, transfer path and transfer direction. With the prior art, however, the DMA controllers cannot be used at optimum performance since the assumption is that the performances of the DMA controllers are identical.

SUMMARY OF THE INVENTION

The present invention enables realization of an information processing apparatus and method of controlling same in which, when data transfer is performed among a plurality of control circuits, which control circuit is used to execute data transfer is controlled appropriately based on the transfer conditions of data transfer.

On aspect of the present invention provides an information processing apparatus having a first control circuit and a second control circuit, comprising: an acquisition unit that acquires a request for data transfer performed between the first and second control circuits; an analyzing unit that analyzes transfer conditions of the data transfer for which the request has been acquired by the acquisition unit; a selecting unit that selects which of the first and second control circuits is to execute the data transfer, which is performed between the first and second control circuits, based on the result of analysis by the analyzing unit; and a control unit that exercises control in such a manner that data transfer is executed by the first control circuit if the first control circuit is selected by the selecting unit and is executed by the second control circuit if the second control circuit is selected by the selecting unit.

Another aspect of the present invention provides a method of controlling an information processing apparatus having a first control circuit and a second control circuit comprising: acquiring a request for data transfer performed between the first and second control circuits; analyzing transfer conditions of the data transfer for which the request has been acquired at the acquiring step; selecting which of the first and second control circuits is to execute the data transfer, which is performed between the first and second control circuits, based on the result of analysis at the analyzing step; and exercising control in such a manner that data transfer is executed by the first control circuit if the first control circuit is selected at the selecting step and is executed by the second control circuit if the second control circuit is selected at the selecting step.

Further features of the present invention will become apparent from the following description of an exemplary embodiment with reference to the attached drawings.

BRIEF DESCRIPTION OF THE DRAWINGS

FIG. 3A is a diagram illustrating the transfer performance of a DMA controller 2215 according to this embodiment;

FIG. 3B is a diagram illustrating the transfer performance of a DMA controller 2241 according to this embodiment;

FIG. 5 is a flowchart illustrating a control procedure for controlling data transfer processing by a CPU 2202 on a main board according to this embodiment.

DESCRIPTION OF THE EMBODIMENT

An embodiment of the present invention will now be described in detail with reference to the drawings. It should be noted that the relative arrangement of the components, the numerical expressions and numerical values set forth in this embodiment do not limit the scope of the present invention unless it is specifically stated otherwise.

<Configuration of Image Forming Apparatus>

Figure 1:
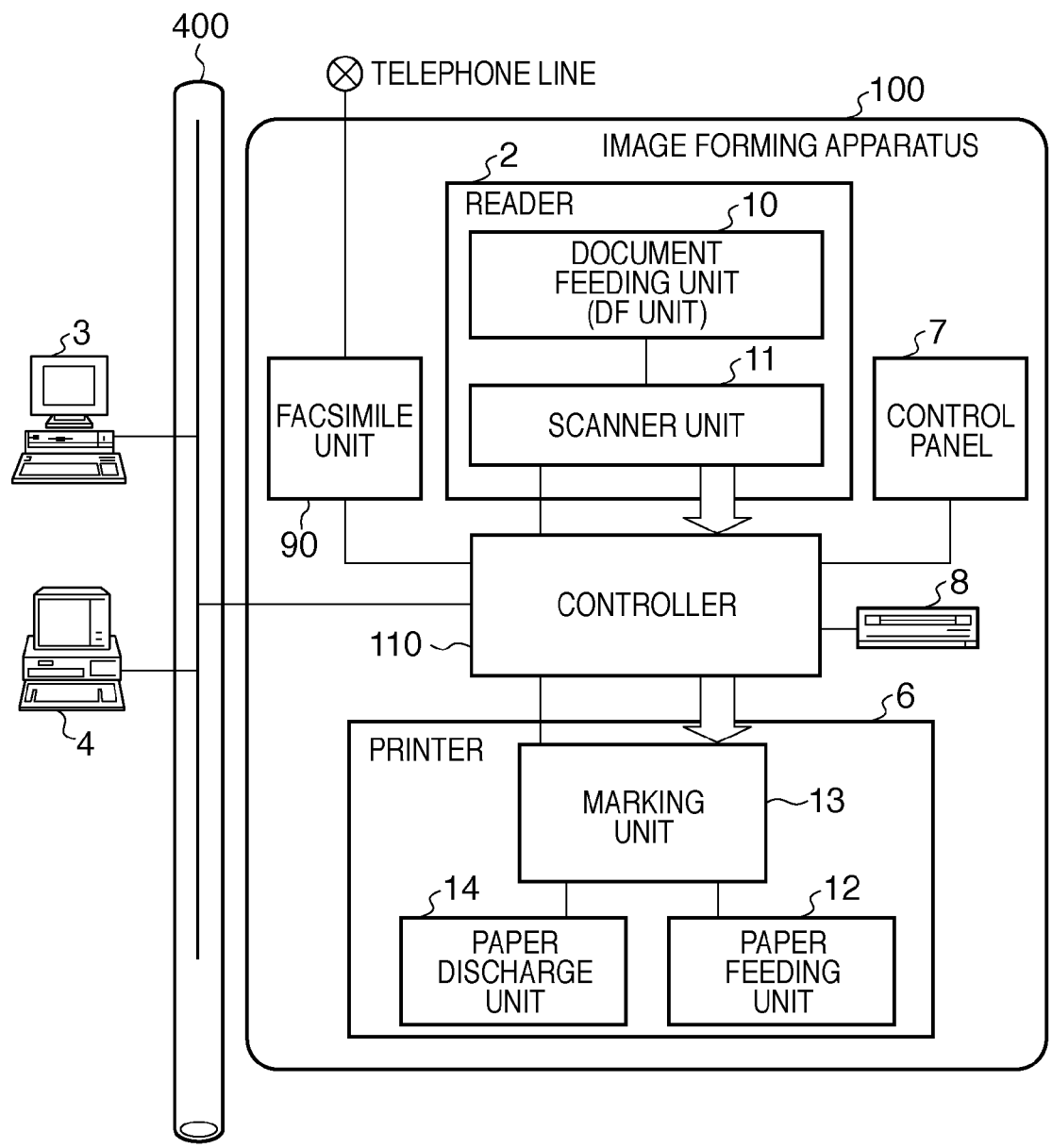
FIG. 1 is a diagram illustrating an example of the configuration of an image forming apparatus according to an embodiment of the present invention.

An embodiment of the present invention will now be described with reference to FIGS. 1 to 6, in which FIG. 1 is a diagram illustrating an example of the configuration of an image forming apparatus according to an embodiment of the present invention. An image forming apparatus 100 such as a multifunction peripheral will be described as an example of an information processing apparatus.

The image forming apparatus 100 is connected to host computers 3, 4, which are external units, via a LAN (Local Area Network) 400 such as Ethernet (registered trademark). The image forming apparatus 100 includes a reader 2, a printer 6, a control panel 7, a hard-disk drive (HDD) 8, a facsimile unit 90 and a controller 110.

The reader 2 executes processing for reading image data, and the printer 6 executes processing for outputting image data. The control panel 7 is a user interface having a keyboard for inputting and outputting image data, and a liquid crystal panel for displaying image data and performing various functions. The hard-disk drive 8 has a control program and image data, etc., written to it in advance. The facsimile unit 90 executes facsimile input/output processing. The controller 110 is connected to each of the above-mentioned constituent elements and comprises a single electronic part for controlling each of the constituent elements.

The reader 2 includes a document feeding unit 10 for feeding document paper, and a scanner unit 11 for optically reading a document image and converting the image to image data in the form of an electric signal. The printer 6 includes a paper feeding unit 12 having a plurality of paper-feed cassettes for accommodating printing paper; a marking unit 13 for transferring and fixing image data to printing paper; and a paper discharge unit 14 for discharging printed paper sheets to the exterior of the apparatus upon subjecting the printed paper to sorting processing and stapling processing.

<Configuration of Controller>

Figure 2:
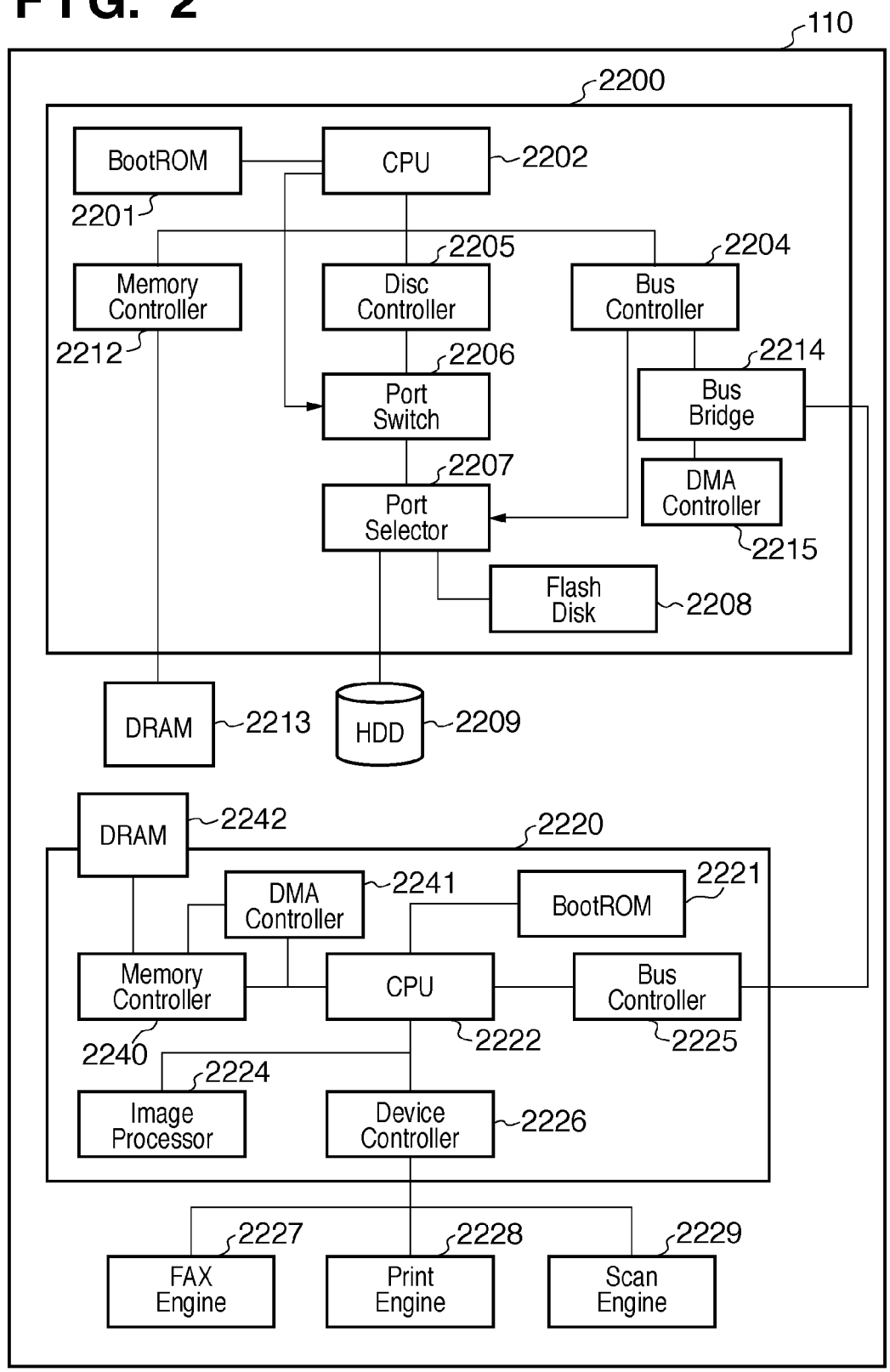
FIG. 2 is a block diagram illustrating the configuration of a controller of the image forming apparatus according to this embodiment.

The configuration of the controller 110 will now be described with reference to FIG. 2, which is a block diagram illustrating the configuration of a controller of the image forming apparatus according to this embodiment.

The controller 110 includes a main board (first control circuit) 2200 for controlling ordinary information processing, and a sub-board (second control circuit) 2220 for controlling image formation processing. It goes without saying that it is possible to construct the main board 2200 and sub-board 2220 as a single board. In order to simplify the description, however, here the embodiment will be described taking as an example a case where the controller is composed of two boards, namely the main board 2200 and sub-board 2220.

Mounted on the main board 2200 are a boot ROM 2201, which is a non-volatile memory in which a boot program has been stored; a CPU 2202, which is a processor for executing the boot program and other programs; a volatile memory 2213 for storing programs and data temporarily; and a memory controller 2212 for controlling memory. Also mounted on the main board 2200 are a bus controller 2204 for controlling connection to the sub-board 2220, and a disk controller 2205 for controlling the hard-disk drive.

Further, a port selector 2207 is connected to the disk controller 2205 via a port switch 2206 for switching between access to a connected device and denial of such access. A flash disk 2208 and a hard-disk drive 2209 are connected to the port selector 2207 and either of which can be selected by the port selector 2207 by control from the disk controller 2205. In the present invention, the disk controller 2205, port switch 2206 and port selector 2207 are described as separate modules. However, it goes without saying that some or all of these can be mounted as a single module. Further, a bus bridge 2214 is mounted on the main board 2200 in order to connect the main board 2200 and sub-board 2220, and a DMA controller (a first DMA controller) 2215 for transferring data between the main board 2200 and sub-board 2220 is mounted on the main board 2200.

On the other hand, mounted on the sub-board 2220 are a boot ROM 2221, which is a non-volatile memory in which a boot program has been stored; a CPU 2222, which is a processor for executing the boot program and other programs; a volatile memory 2242 for storing programs and data temporarily; and a memory controller 2240 for controlling memory. Also mounted on the sub-board 2220 are a bus controller 2225 for controlling connection to the main board 2200; an image processor 2224 for executing image formation processing at high speed; and a device controller 2226 for controlling a device. The device controller 2226 implements control of connected image forming devices such as a facsimile engine 2227, print engine 2228 and scan engine 2229, and executes image formation processing. Further, a DMA controller (a second DMA controller) 2241 for transferring data between the main board 2200 and sub-board 2220 is mounted on the sub-board 2220.

<DMA Controller>

Next, the transfer performance of each of the DMA controllers 2215, 2241 will be described with reference to FIGS. 3A and 3B, in which FIG. 3A is a diagram illustrating the transfer performance of the DMA controller 2215 according to this embodiment and FIG. 3B is a diagram illustrating the transfer performance of the DMA controller 2241 according to this embodiment. A main memory area 1 in FIG. 3A is an area in DRAM 2213 accessed from the memory controller 2212 on main board 2200. Submemory areas 2-1, 2-2 are areas in DRAM 2242 accessed from the memory controller 2240 on sub-board 2220. Although the submemory area 2-1 and the sub-memory area 2-2 are areas in DRAM 2242, there are cases where their transfer performances are different from each other.

As shown in FIG. 3A, the data transfer rate, which is one indication of transfer performance, of data transfer between the main memory area 1 and submemory area 2-1 using the DMA controller 2215 differs depending upon which area is the copy source of the data to be transferred. Further, the DMA controller 2215 cannot perform a data transfer for which the copy source of the data to be transferred is the sub-memory area 2-2. The reason for this is that the bus controller 2225 on the sub-board 2220 cannot define the sub-memory area 2-2 in bus space. The sub-memory area 2-2, therefore, cannot be accessed from the DMA controller 2215 on the main board 2200.

As illustrated in FIG. 3B, the data transfer rate of data transfer between the main memory area 1 and submemory area 2-1 using the DMA controller 2241 differs depending upon which area is the copy source of the data to be transferred. Further, the sub-memory area 2-2 is on the sub-board 2220 and can be accessed from the DMA controller 2241 by the internal bus. The DMA controller 2241 can therefore execute data transfer between the main memory area 1 and the submemory area 2-1. In this case also, however, the transfer rate differs similarly depending upon which area is the copy source.

Further, a table in which the data transfer performance of each DMA controller is defined for every different transfer condition shown in FIGS. 3A and 3B may be stored on the main board 2200 and sub-board 2220 in advance. In this case, each board can execute data transfer processing at optimum performance by selecting the DMA controller whose data transfer performance is highest in accordance with the transfer condition of the data transfer.

FIGS. 3A and 3B are tables selected by a DMA controller provided on a board to which a physical memory storing the data of the copy source is connected. However, implementation is possible using a table different from those shown in FIGS. 3A and 3B. For example, the table may be one selected by a DMA controller provided on a board different from the board to which the physical memory storing the data of the copy source is connected.

<Data Transfer Processing>

Figure 4A:
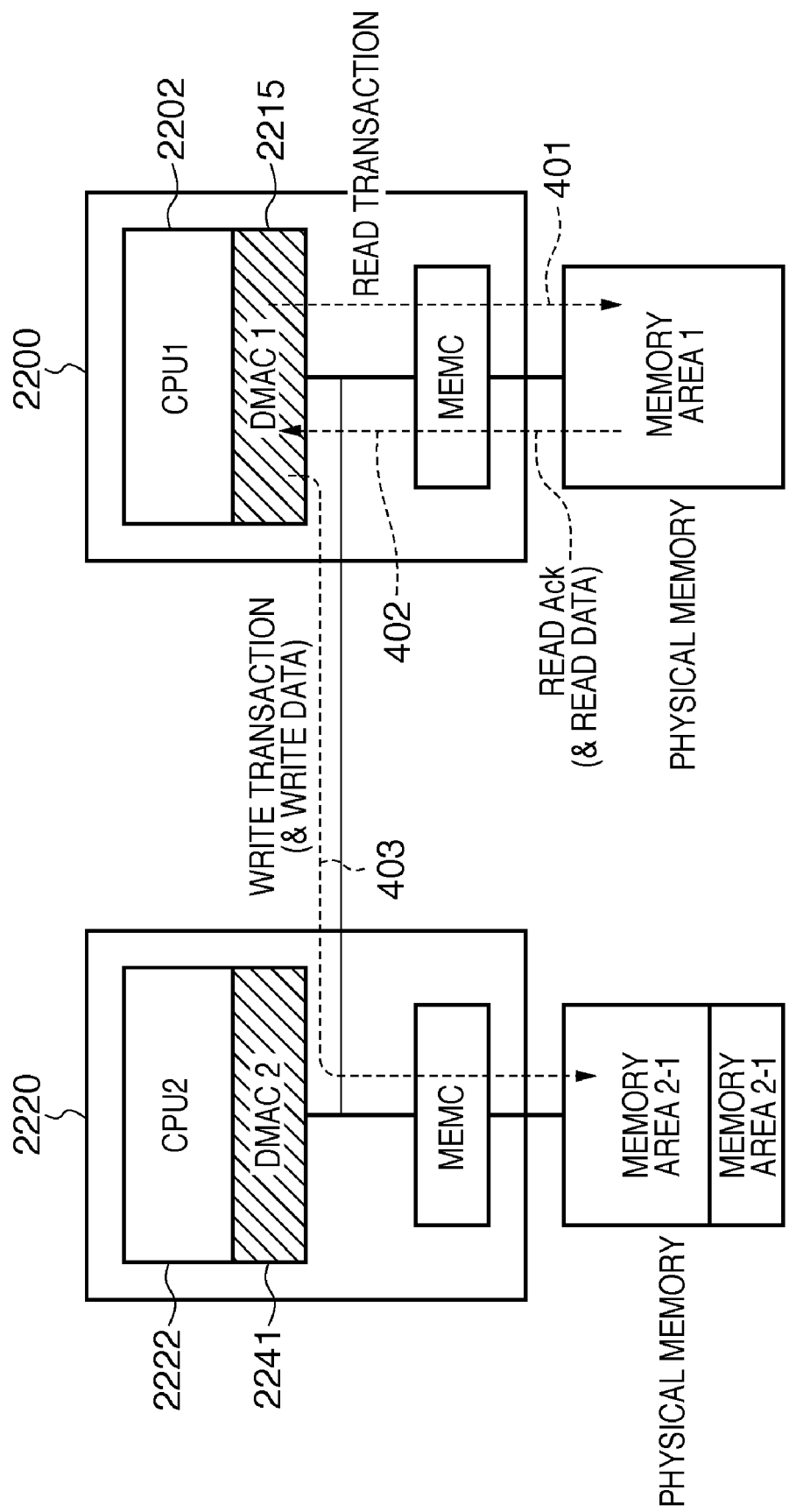
FIG. 4A is a diagram schematically illustrating data transfer in this embodiment.
Figure 4B:
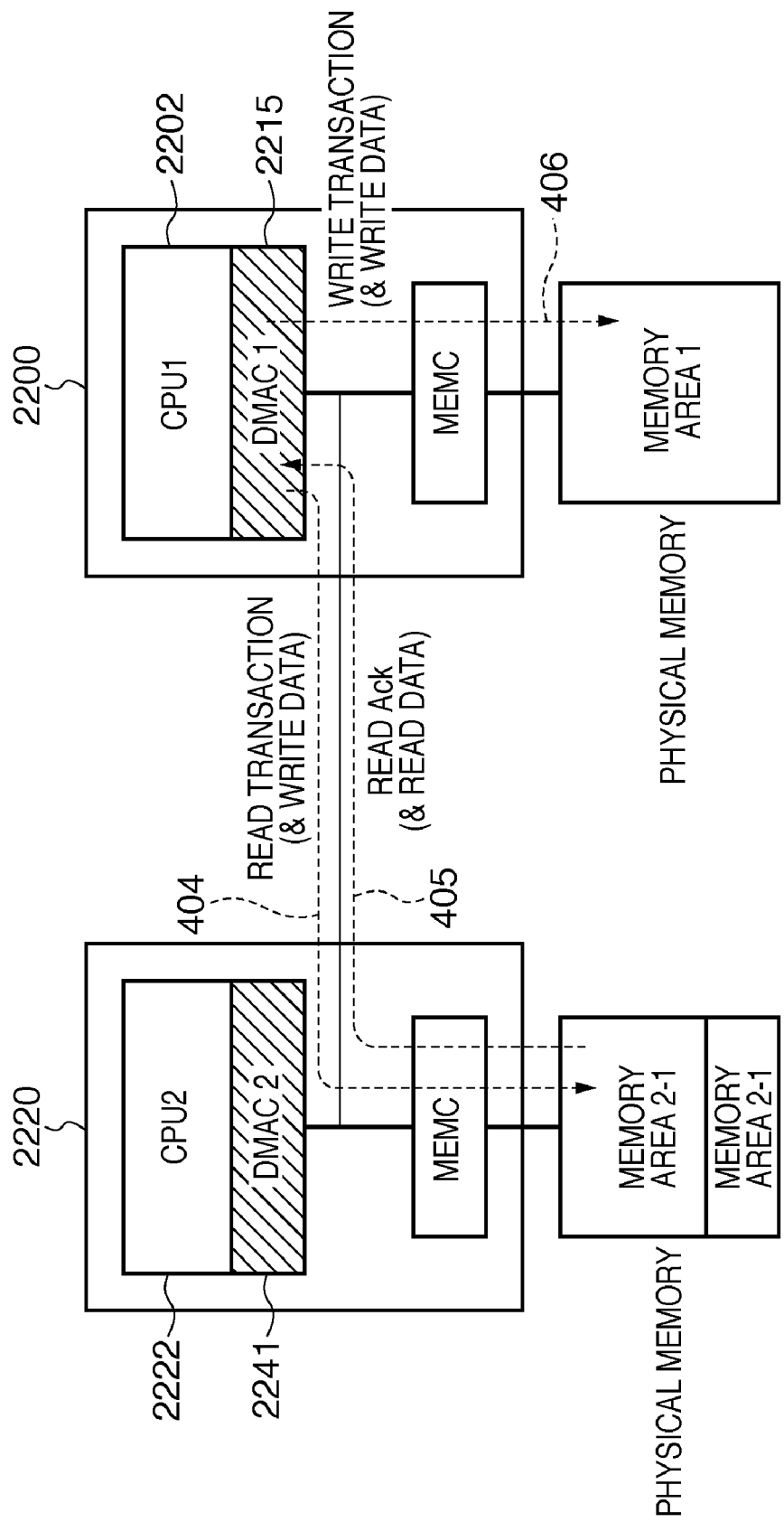
FIG. 4B is a diagram schematically illustrating data transfer in this embodiment.

Next, data transfer processing in this embodiment will be described with reference to FIGS. 4A and 4B, which are diagrams schematically illustrating data transfer according to this embodiment. FIG. 4A is a diagram illustrating the mechanism of data transfer when data in the main memory area 1 is copied to the submemory area 2-1. FIG. 4B, on the other hand, is a diagram illustrating the mechanism of data transfer when data in the submemory area 2-1 is copied to the main memory area 1. Further, these copy operations include a read operation for reading data from the area of a transfer source and a write operation for writing read data to the area of a transfer destination.

First, in a read operation, read transactions 401, 404 are usually issued and then responses 402, 405 thereto and read data are accepted. In a write operation, on the other hand, basically data 403, 406 is sent without waiting for a response to a command. Thus, a read operation takes more time than a write operation since there is an increase in command exchanges.

Accordingly, when a DMA transfer is performed, the higher the bus rate up to the read data, that is, the copy-source data, the faster the DMA transfer itself. In FIGS. 4A and 4B, the memory areas targeted for transfer are the same. In FIG. 4B, however, it takes time in order to achieve read access to a memory at a long distance that spans the units; a greater amount of data is transferred per unit time in FIG. 4A than in FIG. 4B.

Thus, in the DMA controllers 2215, 2241, performance (transfer performance) differs depending upon the data transfer conditions (e.g., whether an area is a transfer-source area or a transfer-destination area). The image forming apparatus 100 in this embodiment selects, on a per-process basis, the DMA controller for which the optimum performance can be obtained and transfer data between the main board 2200 and sub-board 2220 by using this DMA controller.

<Control Flow>

The control flow of data transfer processing according to this embodiment will be described with reference to FIGS. 5 and 6. Here memory copying will be described as an example of data transfer processing. FIG. 5 is a flowchart illustrating a control procedure for controlling data transfer processing in the CPU 2202 on the main board according to this embodiment. The processing described below is mainly under the overall control of the CPU 2202 on main board 2200.

In step S501, the CPU 2202 acquires a memory-copy request from within the application running on the main board 2200. Upon acquiring the memory-copy request, the CPU 2202 determines whether the memory area of the data-transfer source is a memory on the main board 2200 in step S502. Control proceeds to step S503 if the decision rendered is "YES" and to step S510 if the decision is "NO".

In step S503, the CPU 2202 determines whether the DMA controller 2215 has the right to access the memory on the sub-board 2220, which is the data-transfer destination. If the decision is "YES", control proceeds to step S504; if the decision is "NO", then control proceeds to step S510.

In steps S502 and S503, the CPU 2202 functions as analyzing unit for analyzing the transfer conditions of the acquired data transfer. Examples of transfer conditions are which of the boards has the memory that will store the data used in the data transfer, and which of the boards has the memory that is the transfer destination. Further, in steps S504 and S510 described later, the CPU 2202 functions as selecting unit which, based on the result of the above-mentioned analysis, selects which of DMA controllers 2215, 2241 is to control the data transfer.

In step S504, the CPU 2202 starts up the DMA controller 2215. Then, in step S505, the CPU 2202 causes execution of data transfer from the volatile memory 2213 on main board 2200 to the volatile memory 2242 on sub-board 2220 by means of the DMA controller 2215.

On the other hand, if a "NO" decision is rendered in step S502 or S503, then, in step S510, the CPU 2202 communicates with the CPU 2222 on the sub-board 2220 and requests the CPU 2222 for memory copy. Then, in step S511, the CPU 2222 starts up the DMA controller 2241. Furthermore, in step S512, the CPU 2222 causes execution of data transfer from the volatile memory 2242 on sub-board 2220 to the volatile memory 2213 on main board 2200 by means of the DMA controller 2241.

Figure 6:
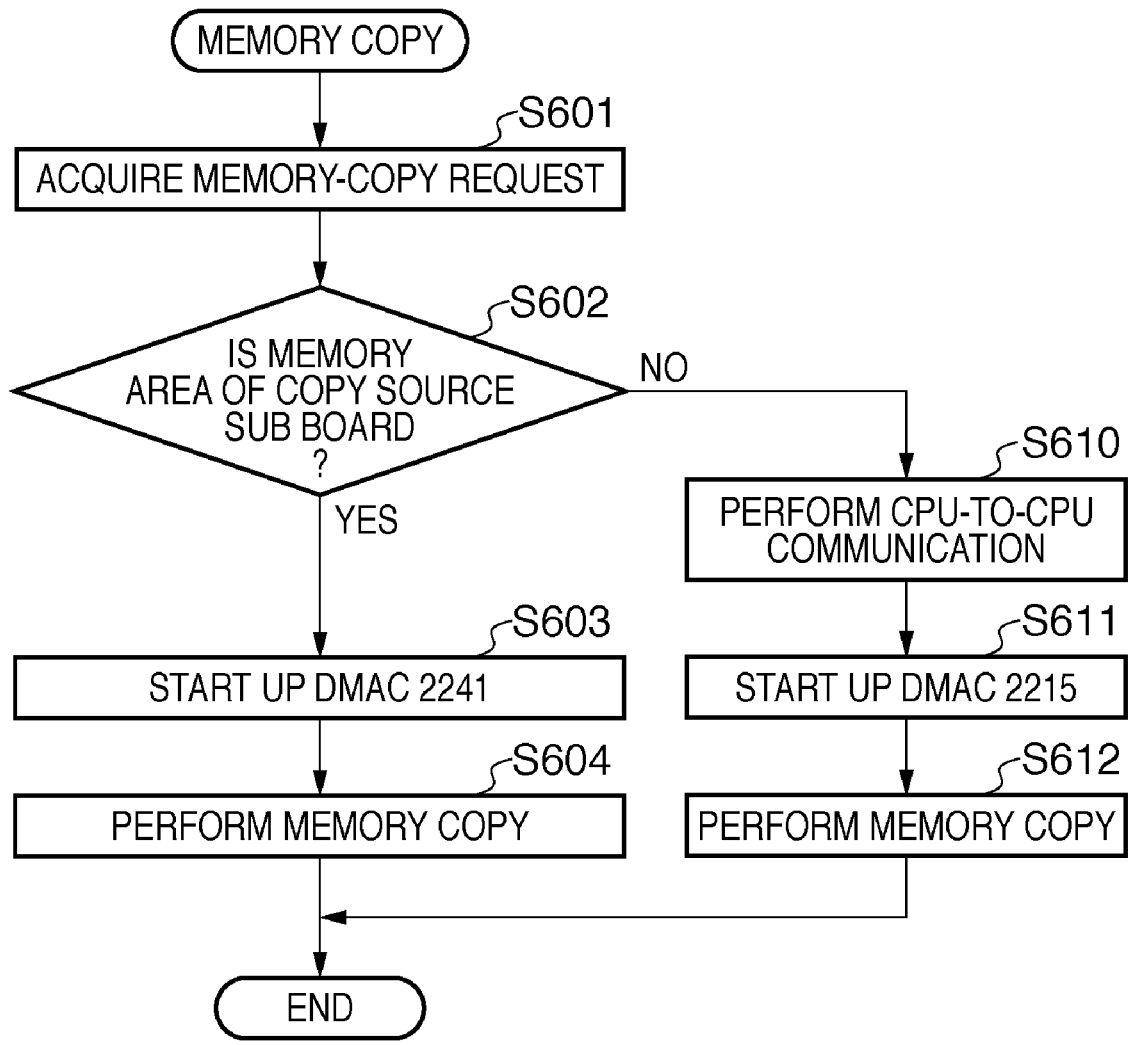
FIG. 6 is a flowchart illustrating a control procedure for controlling data transfer processing by a CPU 2222 on a main board according to this embodiment.

FIG. 6 is a flowchart illustrating a control procedure for controlling data transfer processing in the CPU 2222 on the main board according to this embodiment. The processing described below is mainly under the overall control of the CPU 2222 on sub-board 2220.

In step S601, the CPU 2222 acquires a memory-copy request from within the application running on the sub-board 2220. Upon acquiring the memory-copy request, the CPU 2222 determines whether the memory area of the data-transfer source is a memory on the sub-board 2220 in step S602. Control proceeds to step S603 if the decision rendered is "YES" and to step S610 if the decision is "NO".

In step S602, the CPU 2222 functions as analyzing unit for analyzing the transfer conditions of the acquired data transfer. Here transfer conditions are which of the boards has the memory that will store the data used in the data transfer, and which of the boards has the memory that is the transfer destination of this data. Further, in steps S603 and S610 described later, the CPU 2222 functions as selecting unit which, based on the result of the above-mentioned analysis, selects which of DMA controllers 2215, 2241 is to control the data transfer.

In step S603, the CPU 2222 starts up the DMA controller 2241. Then, in step S604, the CPU 2222 causes execution of data transfer from the volatile memory 2242 on sub-board 2220 to the volatile memory 2213 on the main board 2200 by means of the DMA controller 2241.

On the other hand, if a "NO" decision is rendered in step S602, then, in step S610, the CPU 2222 performs CPU-to-CPU communication and requests the CPU 2202 for memory copy. Then, in step S611, the CPU 2202 starts up the DMA controller 2215. Furthermore, in step S612, the CPU 2202 causes execution of data transfer from the volatile memory 2213 on main board 2200 to the volatile memory volatile memory 2242 on sub-board 2220 by means of the DMA controller 2215.

Thus, as described above, the information processing apparatus according to this embodiment has a plurality of control circuits and, in a case where a request for data transfer is generated among the plurality of control circuits, analyzes the transfer conditions of this data transfer and, based on the result of analysis, selects the DMA controller that is to control the data transfer. As a result, for every transfer condition of data transfer, the information processing apparatus is capable of selecting the DMA controller by which the optimum performance can be obtained and enables the attainment of fully satisfactory performance in a case where the apparatus has a plurality of boards.

It should be noted that the present invention is not limited to the above-described embodiment and can be modified in various ways. For example, a table in which the performance of each DMA controller that differs for every transfer condition is defined may be stored on each board in advance. In this case, when a data transfer occurs, the DMA controller for which the data transfer performance is highest is retrieved from the table, thereby making it possible to easily select the DMA controller having the optimum performance.

The present invention is capable of providing an information processing apparatus and control method thereof in which, when data transfer is performed among a plurality of control circuits, which control circuit is used to execute data transfer is controlled appropriately based on the transfer conditions of data transfer.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-249134, filed on Sep. 26, 2008, which is hereby incorporated by reference herein in its entirety.

What is claimed is:

1. An information processing apparatus having a first control circuit including a first volatile memory and a first DMA controller, and a second control circuit including a second volatile memory and a second DMA controller, the first and second control circuits each including a storage unit that stores a table in which data transfer performance of each control circuit is defined for a different transfer condition, the first DMA controller and the second DMA controller being capable of respectively executing data transfers in both a first direction from the first volatile memory to the second volatile memory and a second direction from the second volatile memory to the first volatile memory, the apparatus comprising:

an acquisition unit that acquires a request for a data transfer performed between the first volatile memory and second volatile memory;

an analyzing unit that analyzes whether the data transfer should be executed in either the first direction or the second direction, based on the request acquired by the acquisition unit;

a selecting unit that selects one of the first and second DMA controllers having a data transfer rate that is faster than a data transfer rate of another of the first and second DMA controllers, when the data transfer is executed in a direction analyzed by the analyzing unit, wherein the selecting unit selects, as a DMA controller to execute the data transfer, a DMA controller having a high data transfer performance in accordance with a transfer condition analyzed by the analyzing unit; and a control unit that exercises control in such a manner that the data transfer is executed by the first control circuit if the first DMA controller is selected by the selecting unit and is executed by the second control circuit if the second DMA controller is selected by the selecting unit.

2. The apparatus according to claim 1, wherein the selecting unit selects the first DMA controller in a case where data to be transferred is data that has been stored in the first volatile memory and the first control circuit has a right to access the second volatile memory that is the transfer destination; and the selecting unit selects the second DMA controller in a case where data to be transferred is data that has been stored in the first volatile memory and the first control circuit does not have the right to access the second volatile memory that is the transfer destination, or in a case where data to be transferred is data that has been stored in the second volatile memory.

3. A method of controlling an information processing apparatus having a first control circuit including a first volatile memory and a first DMA controller, and a second control circuit including a second volatile memory and a second DMA controller, the first and second control circuits each including a storage unit that stores a table in which data transfer performance of each control circuit is defined for a different transfer condition, the first DMA controller and the second DMA controller being capable of respectively executing data transfers in both a first direction from the first volatile memory to the second volatile memory and a second direction from the second volatile memory to the first volatile memory, the method comprising steps of:

acquiring a request for data transfer performed between the first volatile memory and second volatile memory;

analyzing whether a data transfer should be executed in either the first direction or the second direction, based on the request acquired in the acquiring step;

selecting one of the first and second DMA controllers having a data transfer rate that is faster than a data transfer rate of another of the first and second DMA controllers, when the data transfer is executed in a direction analyzed in the analyzing step, wherein the selecting includes selecting, as a DMA controller to execute the data transfer, a DMA controller having a high data transfer performance in accordance with a transfer condition analyzed by the analyzing unit; and exercising control in such a manner that data transfer is executed by the first control circuit if the first DMA controller is selected at the selecting step and is executed by the second control circuit if the second DMA controller is selected in the selecting step.

4. The method according to claim 3, wherein
the first DMA controller is selected in a case where data to be transferred is data that has been stored in the first volatile memory and the first control circuit has a right to access the second volatile memory that is the transfer destination; and
the second DMA controller is selected in a case where data to be transferred is data that has been stored in the first volatile memory and the first control circuit does not have the right to access the second volatile memory that is the transfer destination, or in a case where data to be transferred is data that has been stored in the second volatile memory.

* * * * *